United States Patent
Huang et al.

(10) Patent No.: US 7,638,989 B2
(45) Date of Patent: Dec. 29, 2009

(54) POWER SUPPLY WITH PULSE FREQUENCY MODULATING CIRCUIT CALCULATING LOGIC STATE CHANGING

(75) Inventors: Yen-Lin Huang, Taipei (TW); Kuei-Kai Chang, Hsinchu County (TW); Ming-Chien Li, Yunlin County (TW)

(73) Assignee: Orise Technology Co., Ltd., Hsinchu (TW)

( * ) Notice: Subject to any disclaimer, the term of this patent is extended or adjusted under 35 U.S.C. 154(b) by 315 days.

(21) Appl. No.: 11/737,556

(22) Filed: Apr. 19, 2007

(65) Prior Publication Data

US 2008/0218155 A1 Sep. 11, 2008

(30) Foreign Application Priority Data

Mar. 7, 2007 (TW) .............................. 96107815 A (51) Int. Cl.
*G05F 1/575* (2006.01)
(52) U.S. Cl. .................. 323/222; 323/283; 323/284
(58) Field of Classification Search ................. 323/222, 323/284, 283, 285, 282, 286
See application file for complete search history.

(56) References Cited

U.S. PATENT DOCUMENTS

| 5,568,044 | A | 10/1996 | Bittner |
| 5,801,518 | A | 9/1998 | Ozaki et al. |
| 6,194,883 | B1 | 2/2001 | Shimamori |
| 6,281,668 | B1 | 8/2001 | Sudo |
| 6,577,110 | B2 | 6/2003 | Van Auken |
| 6,847,231 | B2 * | 1/2005 | Kinugawa et al. ............. 326/82 |
| 6,969,963 | B2 * | 11/2005 | Sakai et al. ............ 318/400.27 |
| 6,972,548 | B2 | 12/2005 | Tzeng et al. |
| 7,075,280 | B2 | 7/2006 | May |
| 7,102,339 | B1 | 9/2006 | Ferguson |
| 7,109,695 | B2 | 9/2006 | King |

\* cited by examiner

*Primary Examiner*—Harry Behm
(74) *Attorney, Agent, or Firm*—J.C. Patents (57) ABSTRACT

A method for stabling a voltage, a pulse frequency modulating circuit and a power supply using the same are provided. The method includes the following steps. First, a comparing signal is provided. Then, set the comparing signal to be a first logic state when the voltage to be stabilized is lower than a preset voltage. Next provide a pulse signal when the comparing signal is set in the first logic state. Afterwards, adjust the enable time of the pulse signal based on the number of times of logic state changing of the comparing signal within a preset period and, adjust the voltage according to the enable time of the pulse signal.

17 Claims, 5 Drawing Sheets

POWER SUPPLY WITH PULSE FREQUENCY MODULATING CIRCUIT CALCULATING LOGIC STATE CHANGING

CROSS-REFERENCE TO RELATED APPLICATION

This application claims the priority benefit of Taiwan application serial no. 96107815, filed Mar. 7, 2007. All disclosure of the Taiwan application is incorporated herein by reference.

BACKGROUND OF THE INVENTION

1. Field of the Invention

The present invention relates to a power supply. More particularly, the present invention relates to a pulse frequency modulating circuit which may automatically adjust the working period, and a power supply using the pulse frequency modulating circuit, and a method for stabling voltage.

2. Description of Related Art

Power supply is a commonly used product in our daily life, and nearly every electrical product has a power supply for supplying power to the loads such as speakers, electric heaters, screens, lamps and motors etc. In recent years, in the field of power supply, the energy conversion efficiency changes as the load changes, and we hope the power supply may still provide a high efficient and stable power when a system is full loaded or a significant changing of load occurs in a system. On the application level, the electronic products such as processors, random access memories, displays and cell phones etc. are seldom full loaded all the time, especially the mobile communication products such as cell phones are usually in a energy saving mode of on-call state. Thus, a power supply which may provide a high energy conversion efficiency under any state of load is very important.

Figure 1:
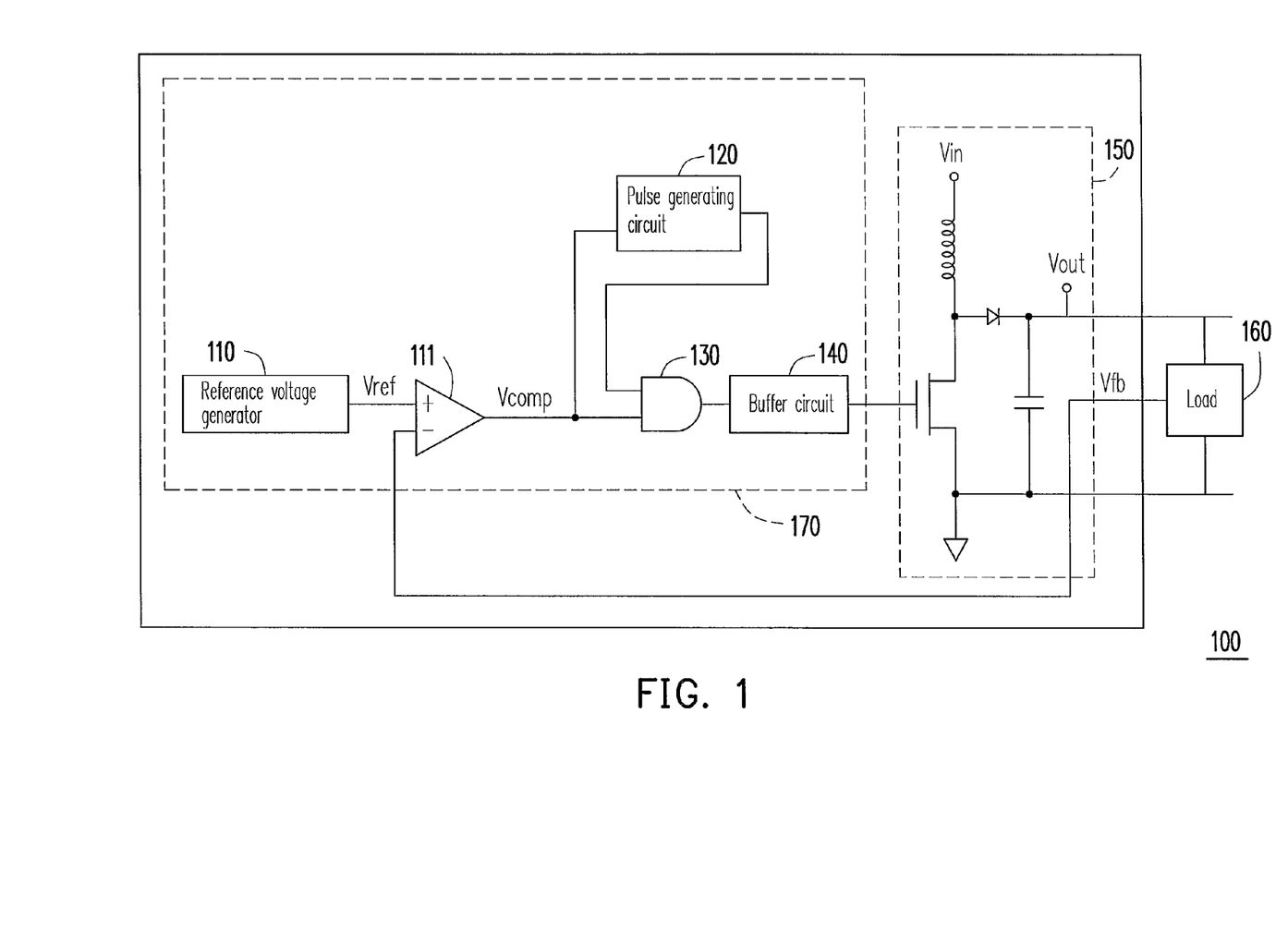
FIG. 1 is a circuit diagram of a conventional power supply.

FIG. 1 is a circuit diagram of a conventional power supply. Referring to FIG. 1, the power supply 100 includes a pulse frequency modulating circuit 170 and a power converting circuit 150 for driving a load 160, wherein the pulse frequency modulating circuit 170 includes a reference voltage generator 110, an amplifier 111, a pulse generating circuit 120, an AND gate 130 and a buffer circuit 140. The boost converter is used as example for the power converting circuit 150.

The operation of the circuit of FIG. 1 is as follows: the amplifier 111 processes a feedback voltage Vfb and a reference voltage Vref generated by the reference voltage generator 110. Since the feedback voltage Vfb is in direct proportion to the output voltage Vout, if the feedback voltage Vfb is greater than the reference voltage Vref, it means the present output voltage Vout is relatively high, and there is no need for pulling up the output voltage Vout through the boost circuit 150. Here the output comparing signal Vcomp of the amplifier 111 is logical low, and thus the AND gate 130 ignores the pulse signal from the pulse generating circuit 120, and outputs a logical low to halt the boost circuit 150. When the output voltage Vout is decreased, and the feedback voltage Vfb is lower than the reference voltage Vref, the output comparing signal Vcomp of the amplifier 111 is logical high, and thus the output signal of the AND-gate 130 is a pulse signal from the pulse generating circuit 120. The pulse signal processed by the buffer circuit 140 increases its driving ability and drives the boost circuit 150 for increasing the output voltage Vout.

In the aforementioned related art, the pulse signal generated by the pulse generating circuit 120 has a fixed enable time. If the enable time is too short, the pulse frequency modulating circuit 170 will spend a long time for pulling up the output voltage Vout through the boost circuit 150. However, if the enable time is too long, though the boost circuit 150 may quickly pull up the output voltage Vout, but more power is wasted on energy conversion, and the efficiency of energy conversion may decrease accordingly, and a low efficiency of energy conversion will cause a significant consumption of power and increase the operation temperature of the product.

Thus, during the production of the pulse frequency modulating circuit 170, some of the manufacturers consider to use a programmable pulse generating circuit 120 with a function of setting the enable time. A system engineer of a manufacture plant, who uses the pulse frequency modulating circuit 170 may adjust enable time through the programmable pulse generating circuit 120 based on different application. Since there are no certain rules for adjusting the enable time, the engineer has to spend a lot of time on experimentation to obtain a preferred enable time according to the application of the product. However, this try and error method will waste a lot of time. If it is lucky enough or the system engineer is experienced, the preferred enable time may be obtained within two or three experimentations, but with a bad luck or an inexperienced engineer, hundreds of experimentations have to be performed for obtaining the preferred enable time. Thus, this try and error method may greatly increase the development costs and delay the delivery time of said product which may cause loss of business opportunities, and the loss may be immeasurable.

SUMMARY OF THE INVENTION

The present invention is directed to a pulse frequency modulating circuit which may automatically adjust a working period, configured to improve the energy conversion efficiency.

The present invention is directed to a power supply having the function of automatically improving the energy conversion efficiency, configured to reduce the development costs of the power supply.

The present invention is directed to a method for stabling voltage and improving the energy conversion efficiency, configured to reduce the power consumption.

The present invention provides a pulse frequency modulating circuit for controlling a power converter. The pulse frequency modulating circuit includes an output voltage comparing circuit, a pulse generating circuit and a switch circuit. The output voltage comparing circuit receives a feedback voltage, and compares the feedback voltage with a reference voltage. Since the feedback voltage is in proportion to the output voltage of the power converter, the feedback voltage may respond to a state of an output voltage of the power converter. The output voltage comparing circuit generates a comparing signal based on a comparing result between the reference voltage and the feedback voltage, and outputs the comparing signal.

The output voltage comparing circuit transmits the comparing signal to the switch circuit and the pulse generating circuit. According to one aspect, the pulse generating circuit calculates a number of times of logic state changing of the comparing signal within a preset period and determines an enable time of the pulse signal based on the number of times of logic state changing. Moreover, according to another aspect, the pulse generating circuit may also calculate a logic state changing time needed for reaching a preset number of times of logic state changing of the comparing signal. Then, the pulse generating circuit determines an enable time of the pulse signal based on the logic state changing time and outputs a pulse signal when the comparing signal is in a first logic state.

The switch circuit is coupled to the pulse generating circuit, the output voltage comparing circuit and the power converter. When the comparing signal is in a first logic state, the switch circuit transmits the pulse signal from the pulse generating circuit to the power converter. Then, the power converter adjusts the output voltage based on the enable time of the pulse signal.

The pulse frequency modulating circuit of the present invention may identify whether an enable time of the pulse signal is suitable or not according to the aforementioned number of times of logic state changing or the aforementioned logic state changing time, and may automatically adjust the enable time for improving the energy conversion efficiency.

According to another aspect of the present invention, a power supply having a function of automatically adjusting the efficiency of energy conversion is provided, configured to output an output voltage. The power supply includes a pulse frequency modulating circuit and a power converter. The pulse frequency modulating circuit generates a comparing signal according to the state of the power converter. In other words, the comparing signal is set in a first logic state when the output voltage of the power converter is lower than a preset voltage. According to one aspect, the pulse frequency modulating circuit calculates a number of times of logic state changing of the comparing signal within a preset period and adjusts an enable time of the pulse signal based on the number of times of logic state changing. According to another aspect, the pulse frequency modulating circuit calculates a logic state changing time needed for reaching a preset number of times of logic state changing of the comparing signal, adjusts the enable time of the pulse signal based on the logic state changing time, and outputs a pulse signal to the power converter when the comparing signal is in a first logic state. The power converter coupled to the pulse frequency modulating circuit adjusts the output voltage according to the enable time of the pulse signal.

As described above, since the power supply of the present invention may adjust the output voltage, it has a function of automatically improving the efficiency of energy conversion. The power supply of the present invention adjusts the comparing signal of the pulse frequency modulating circuit according to the state of the output voltage, and adjusts the enable time of the pulse signal according to the aforementioned number of times of logic state changing or the aforementioned logic state changing time, then adjusts the output voltage according to the enable time of the pulse signal for improving the efficiency of energy conversion.

According to another aspect of the present invention, a method for stabling voltage and improving the energy conversion efficiency is provided. The method includes the following steps:

First, a comparing signal is provided. Then, the comparing signal is set in a first logic state when the output voltage is lower than a preset voltage. Conversely, the comparing signal is set in a second logic state. Next, a pulse signal is provided when the comparing signal is set in the first logic state. The enable time of the pulse signal determines the time needed for the output voltage reaching a stable state. Afterwards, a number of times of logic state changing of the comparing signal is calculated within a preset period or a logic state changing time needed for reaching a preset number of times of logic state changing of the comparing signal is calculated. Then, the enable time of the pulse signal is adjusted based on the aforementioned number of times of logic state changing or the aforementioned logic state changing time, and the time needed for the output voltage reaching a stable state, is adjusted accordingly.

This method determines a suitable enable time according to the aforementioned number of times of logic state changing or the aforementioned logic state changing time, so as to avoid extra consumption of power.

In summary, in the present invention, a function of automatically adjusting the enable time of the output pulse is added in the pulse frequency modulating technique, thus, the present invention has at least the following advantages:

1. The time needed for an output voltage reaching a stable state may be automatically adjusted according to the present invention, and thus the efficiency of energy conversion is improved, and extra consumption of power is avoided.

2. The enable time of the pulse signal may be automatically adjusted according to the present invention, and thus, no need for a manufacturer spending human resources and time on searching of the suitable enable time during production, and a tremendous development costs is saved accordingly.

In order to make the aforementioned and other objects, features and advantages of the present invention comprehensible, a preferred embodiment accompanied with figures is described in detail below.

DESCRIPTION OF EMBODIMENTS

Figure 2:
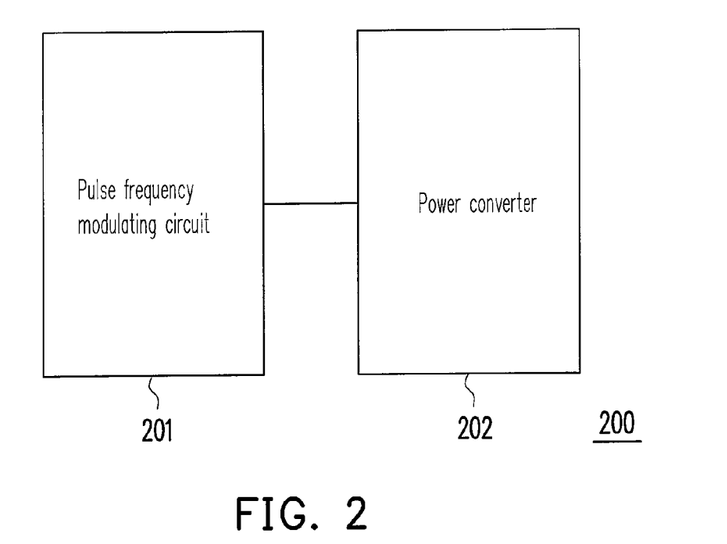
FIG. 2 is a block diagram illustrating a circuit of a power supply according to an embodiment of the present invention.

FIG. 2 is a block diagram illustrating a circuit of a power supply according to an embodiment of the present invention. Referring to FIG. 2, the power supply 200 includes a pulse frequency modulating circuit 201 and a power converter 202. A comparing signal is provided inside the pulse frequency modulating circuit 201, the logic state of the comparing signal changes with the output voltage Vout. For example, the comparing signal is set in a first logic state when the output voltage is lower than a preset voltage. There are many ways of providing a comparing signal, for example, directly detecting an output voltage or dividing the output voltage and comparing a reference voltage with the divided output voltage.

Moreover, the pulse frequency modulating circuit 201 provides a pulse signal to the power converter 202 when the comparing signal is set in a first logic state. Since the comparing signal changes with the output voltage Vout, in the present embodiment, the comparing signal is used for judging the load level, and the aforementioned pulse signal is adjusted according to the comparing signal. In the present embodiment, a number of times of logic state changing of the comparing signal is calculated within a preset period and an enable time of the pulse signal is adjusted based on the number of times of logic state changing. Then, the power converter 202 may adjust the output voltage according to the enable time of the pulse signal.

Similarly, in another embodiment, with a same essence but a different method, the number of times of logic state changing may be preset, then the time needed for a number of times of logic state changing of the comparing signal reaching the preset number of times is calculated and defined as a logic state changing time. An enable time of the pulse signal is adjusted according to the logic state changing time. Then, the power converter 202 may adjust the output voltage according to the enable time of the pulse signal. In summary, the enable time of the pulse signal is adjusted according to a parameter, and the parameter is a logic state changing frequency (the number of times of logic state changing/logic state changing time) of the comparing signal. The aforementioned two methods, one is to preset a fixed number of times of logic state changing, configured to obtain a logic state changing time; another one is to preset a fixed logic state changing time, configured to obtain a number of times of logic state changing. These two methods are two different processing methods with a same essence.

Figure 3:
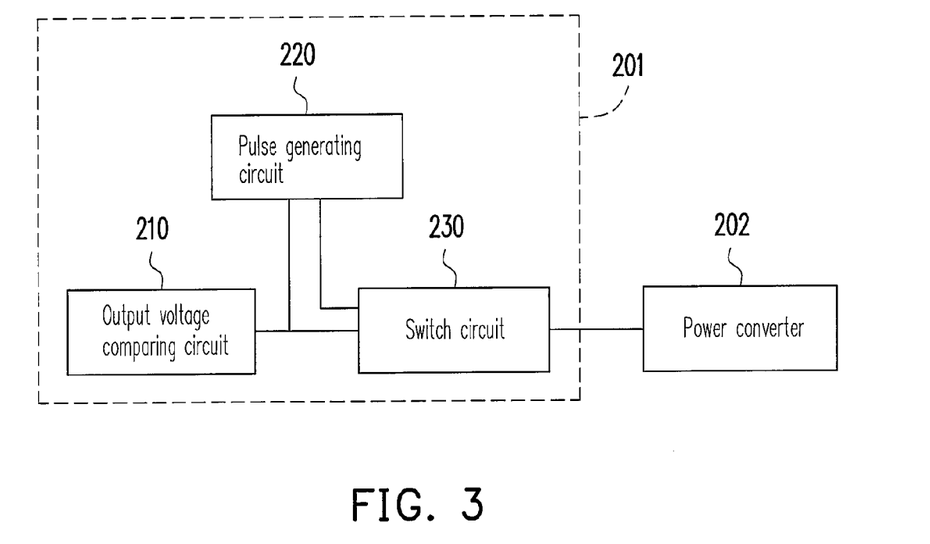
FIG. 3 is a detailed block diagram illustrating the circuit of a pulse frequency modulating circuit 201 according to an embodiment of the present invention.

FIG. 3 is a detailed block diagram illustrating the circuit of a pulse frequency modulating circuit 201 according to an embodiment of the present invention. Referring to FIG. 3, a power converter is illustrated in FIG. 3 for fully conveying the concept of the invention. The pulse frequency modulating circuit 201 includes an output voltage comparing circuit 210, a pulse generating circuit 220 and a switch circuit 230. The pulse frequency modulating circuit 201 is for controlling an output voltage of the power converter 202. The power converter 202 generates a feedback voltage in proportion to the output voltage. The output voltage comparing circuit 210 compares the feedback voltage with a reference voltage and outputs a comparing signal according to a comparing result. Thus, the comparing signal responds to a state of the output voltage.

For example, the power converter 202 may take a divided voltage of the output voltage as a feedback voltage, thus the feedback voltage is in proportion to the output voltage. A reference voltage is preset inside the output voltage comparing circuit 210. When the feedback voltage is lower than the reference voltage, it means the output voltage is lower than a preset voltage regulated in a product specification, and the output voltage comparing circuit 210 may set the comparing signal in a first logic state. Conversely, the output voltage comparing circuit 210 may set the comparing signal in a second logic state. Thus, the comparing signal may respond to a state of the output voltage.

The pulse generating circuit 220 receives the aforementioned comparing signal and calculates a number of times of logic state changing of the comparing signal within a preset period and determines an enable time of the pulse signal based on the number of times of logic state changing. According to another aspect, in another embodiment, a number of times of logic state changing may be preset, and the time needed for the number of times of logic state changing of the comparing signal reaching the preset number of times is calculated and defined as a logic state changing time. Then, an enable time of the pulse signal is determined based on the logic state changing time.

Those people having ordinary skill in the art should know that the enable time determines the time needed for the output voltage of the power converter 202 reaching a stable state, i.e. if the enable time of the pulse signal of the pulse frequency modulating circuit 201 is relatively long, the power converter 202 may quickly pull up the output voltage. However, more power will be consumed on energy conversion, and the state of the output voltage by now may increase the logic state changing frequency. Conversely, if the enable time is relatively short, the power converter 202 has to spend a long time to pull up the output voltage, and the logic state changing frequency of the comparing signal is decreased accordingly.

When the comparing signal is set in a first logic state, the pulse generating circuit 220 outputs a pulse signal to the switch circuit 230. The switch circuit 230 receives the comparing signal and the pulse signal, and transmits the pulse signal to the power converter 202 when the comparing signal is in a first logic state. Then, the power converter 202 adjusts the time needed for the output voltage reaching a stable state, according to the enable time of the pulse signal.

As described above, in the present embodiment, the pulse generating circuit 220 calculates the number of times of logic state changing of the comparing signal and adjusts the enable time of the pulse signal according to the calculated number of times, so as to improve the energy conversion efficiency of the power converter 202. Certainly, in another embodiment, the pulse generating circuit 220 may also adjust the enable time of the pulse signal according to the logic state changing time. Thus, the problems such as extra power consumption due to a low efficiency of energy conversion and a high operation temperature of the product due to the escaping energy during energy conversion, occurred in the conventional techniques will be solved. In addition, since the pulse frequency modulating circuit 201 of the present embodiment may automatically adjust the enable time of the pulse signal according to the state of the output voltage, there is no need for a manufacturer spending human resources and time on searching of the suitable enable time. Thus, a tremendous development costs is saved accordingly.

Figure 4:
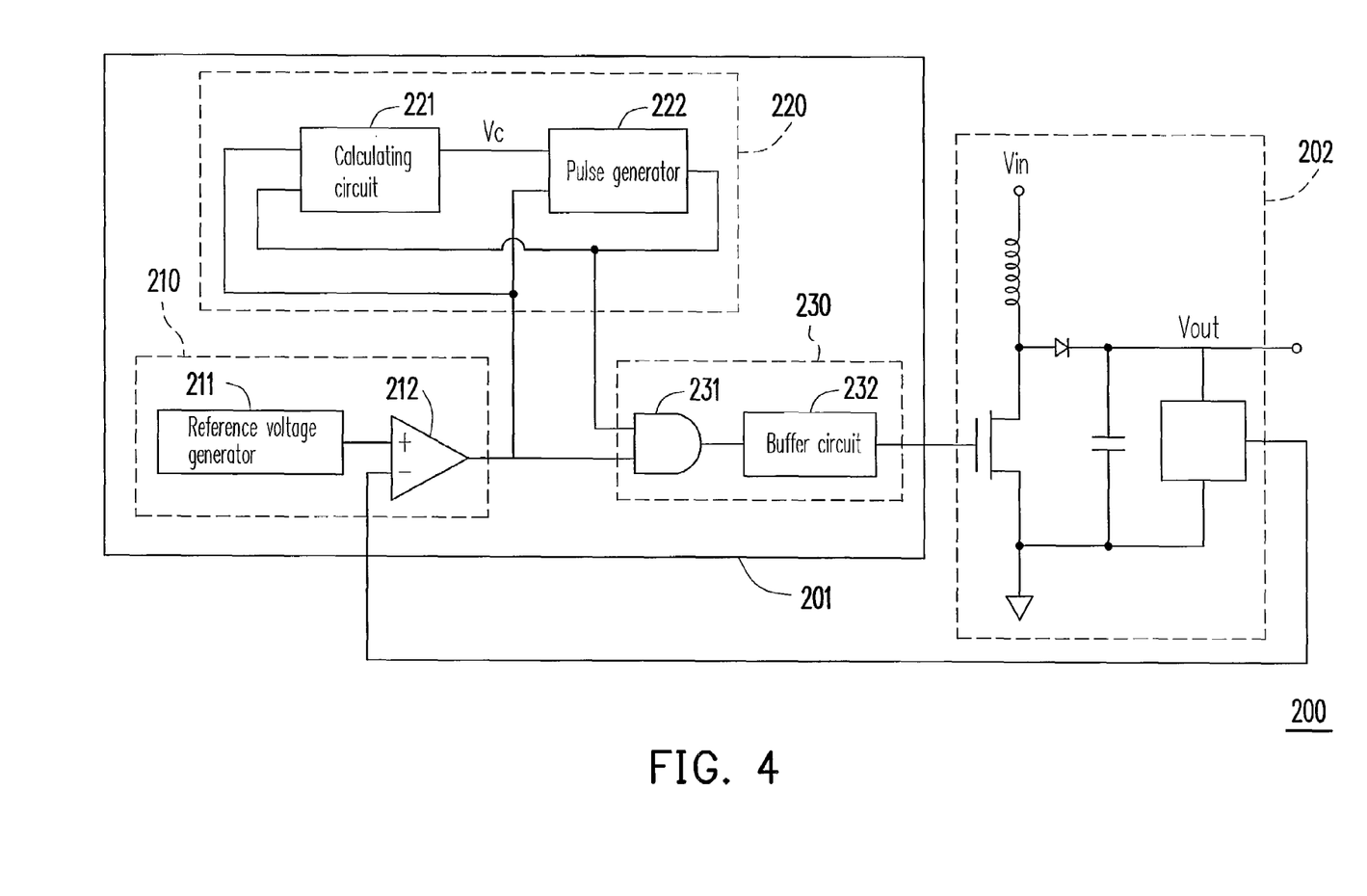
FIG. 4 is a detailed circuit diagram of a power supply 200 according to an embodiment of the present invention.

FIG. 4 is a detailed circuit diagram of a power supply 200 according to an embodiment of the present invention. Please refer to FIG. 4 for its coupling relation, the detailed description thereof will not be repeated. The output voltage comparing circuit 210 includes a reference voltage generator 211 and an amplifier 212. The reference voltage generator 211 generates a reference voltage Vref, the positive input terminal of the amplifier 212 receives the reference voltage Vref. The power converter 202 generates a feedback voltage Vfb, the negative input terminal of the amplifier 212 receives the feedback voltage Vfb. Then, the amplifier 212 generates a comparing signal Vcomp according to the reference voltage Vref and the feedback voltage Vfb, wherein if the reference voltage Vref is greater than the feedback voltage Vfb, it means the output voltage Vout of the power converter 202 is too low, and the comparing signal is set in a first logic state, which is logical high in the present embodiment. Conversely, the comparing signal is set in a second logic state, which is logical low in the present embodiment.

The pulse generating circuit 220 includes a calculating circuit 221 and a pulse generator 222. The output voltage comparing circuit 210 transmits the comparing signal Vcomp to the first input terminal of the calculating circuit 221 and the second input terminal of the pulse generator 222. The calculating circuit 221 calculates a number of times for the comparing signal Vcomp changing from logical low to logical high within a preset period and generates a pulse width ratio Vc according to the number of times of state changing of the comparing signal (i.e. number of times of logic state changing). Then, the pulse width ratio Vc is transmitted to the first input terminal of the pulse generator 222. The pulse generator 222 then adjusts the enable time of the pulse signal according to the pulse width ratio Vc.

The switch circuit 230 includes an AND gate 231 and a buffer circuit 232. The first input terminal of the AND gate 231 receives the comparing signal Vcomp and the second input terminal of the AND gate 231 receives the pulse signal for logic AND calculation, then the calculated result is transmitted to the buffer circuit 232. The buffer circuit 232 increases the driving ability of the calculated result and outputs the calculated result to the power converter 202. In other words, the AND gate 231 receives the comparing signal Vcomp and the pulse signal, and transmits the pulse signal to the buffer circuit 232 when the comparing signal Vcomp is logical high. Conversely, the AND gate 231 ignores the pulse signal from the pulse generator 222 when the comparing signal Vcomp is logical low.

As described above, the calculating circuit 221 calculates a number of times of logic state changing of the comparing signal Vcomp within a preset period. If the number of times of logic state changing is too high, it means the enable time of the pulse signal is too long, and though the power converter 202 may quickly reach a state of outputting stable output voltage Vout, extra power consumption of the power converter 202 will be significant. Conversely, if the number of times of logic state changing is too low, it means the enable time of the pulse signal is too short, and the power converter 202 has to spend a long time to reach a state of outputting stable output voltage Vout. In the present embodiment, a calculating circuit 221 is applied for outputting a pulse width ratio Vc, and the pulse generator 222 may adjust the enable time of the pulse signal according to the pulse width ratio Vc, so as to control the state of the output voltage Vout.

According to another aspect, in another embodiment of the present invention, the enable time of the pulse signal may be adjusted according to another method with a same essence. For example, the calculating circuit 221 may also calculate a logic state changing time of the comparing signal Vcomp, the logic state changing time is a time needed for a number of times of logic state changing of the comparing signal Vcomp reaching a preset number of times. If the logic state changing time is too short, it means the enable time of the pulse signal is too long, and though the power converter 202 may quickly reach a state of outputting stable output voltage Vout, extra power consumption of the power converter 202 will be significant. Conversely, if the logic state changing time is too long, it means the enable time of the pulse signal is too short, the power converter 202 has to spend a long time to reach a state of outputting stable output voltage Vout. In the present embodiment, a calculating circuit 221 is applied for outputting a pulse width ratio Vc, and the pulse generator 222 may adjust the enable time of the pulse signal according to the pulse width ratio Vc, so as to control the state of the output voltage Vout.

It should be noted that in the aforementioned embodiment, the feedback voltage Vfb of the output voltage comparing circuit 210 is in direct ratio to the output voltage Vout of the power converter 202, but this is not to limit the actual implementation. Those people having ordinary skill in the art should know that the feedback voltage Vfb might also be in inverse ratio to the output voltage Vout, or the feedback voltage Vfb and the output voltage Vout might have a functional relation. Certainly, when the relation between the feedback voltage Vfb and the output voltage Vout is changed, the structure of the switch circuit 230 will be changed.

For example, the feedback voltage Vfb may be set in inverse ratio to the output voltage Vout, then the feedback voltage Vfb is fed to the positive terminal of the amplifier 212, and the reference voltage Vref is fed to the negative terminal of the amplifier 212, so as to achieve the same effect with the original design. Thus, the aforementioned embodiment is for the purpose of describing the essence of the invention only and is not intended to be limiting of the invention.

The aforementioned power converter 202 includes an inductor, a switch transistor, a unidirectional conductive element, a capacitor and a feedback circuit. Please refer to FIG. 4 for its coupling relation, the detailed description thereof will not be repeated. It should be noted that the power converter 202 having a feedback circuit generates a feedback voltage Vfb according to the output voltage Vout. In the present embodiment, a boost converter is used as example for the power converter 202 to convey the essence of the present invention, but this is not to limit the actual implementation, those people having ordinary skill in the art should know that other types of power converter such as a buck-boost converter, a buck converter or a cuk converter and so forth may also be used without departing from the essence and scope of the present invention.

Figure 5:
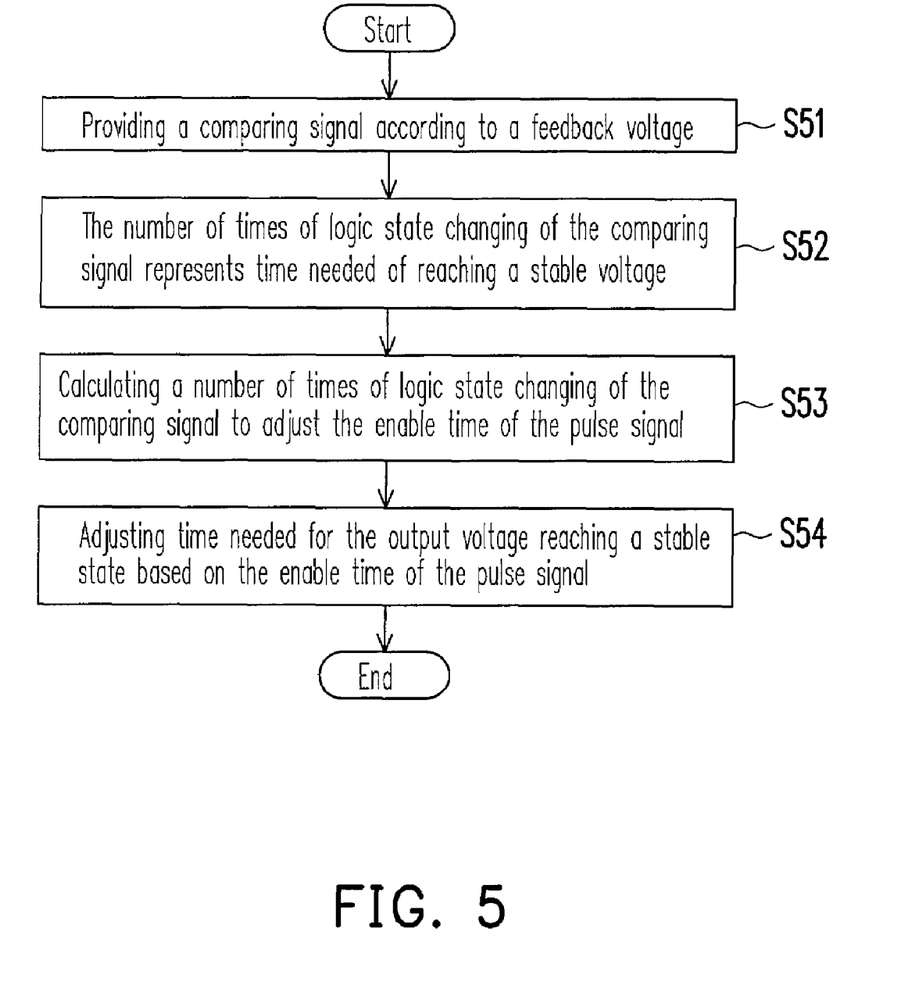
FIG. 5 and FIG. 5A are flowcharts of methods for stabling a voltage and improving the energy conversion efficiency according to an embodiment of the present invention.

A method for stabling voltage and improving the energy conversion efficiency according to an embodiment of the present invention is provided below. Referring to FIG. 5, FIG. 5 is a flowchart of a method for stabling a voltage and improving the energy conversion efficiency according to an embodiment of the present invention.

First, referring to step S51, a comparing signal is generated according to a feedback voltage of the output voltage. If the feedback voltage is lower than a reference voltage, the comparing signal is set in a first logic state. Conversely, the comparing signal is set in a second logic state. The number of times of logic state changing of the comparing signal represents the time needed for the output voltage reaching a stable state (step S52).

Certainly, it is not good if the time needed for the output voltage reaching a stable state is too long, however, if the time needed for the output voltage reaching a stable state is too short, it means the enable time of the pulse signal is too long, extra power will be wasted on energy conversion, and the efficiency of energy conversion decreases accordingly. Thus, in the present invention, a number of times of logic state changing of the comparing signal is calculated within a preset period. The enable time of the pulse signal is adjusted based on the number of times of logic state changing (step S53). Finally, the time needed for the output voltage reaching a stable state is adjusted based on the enable time of the pulse signal (step S54).

Figure 5A:
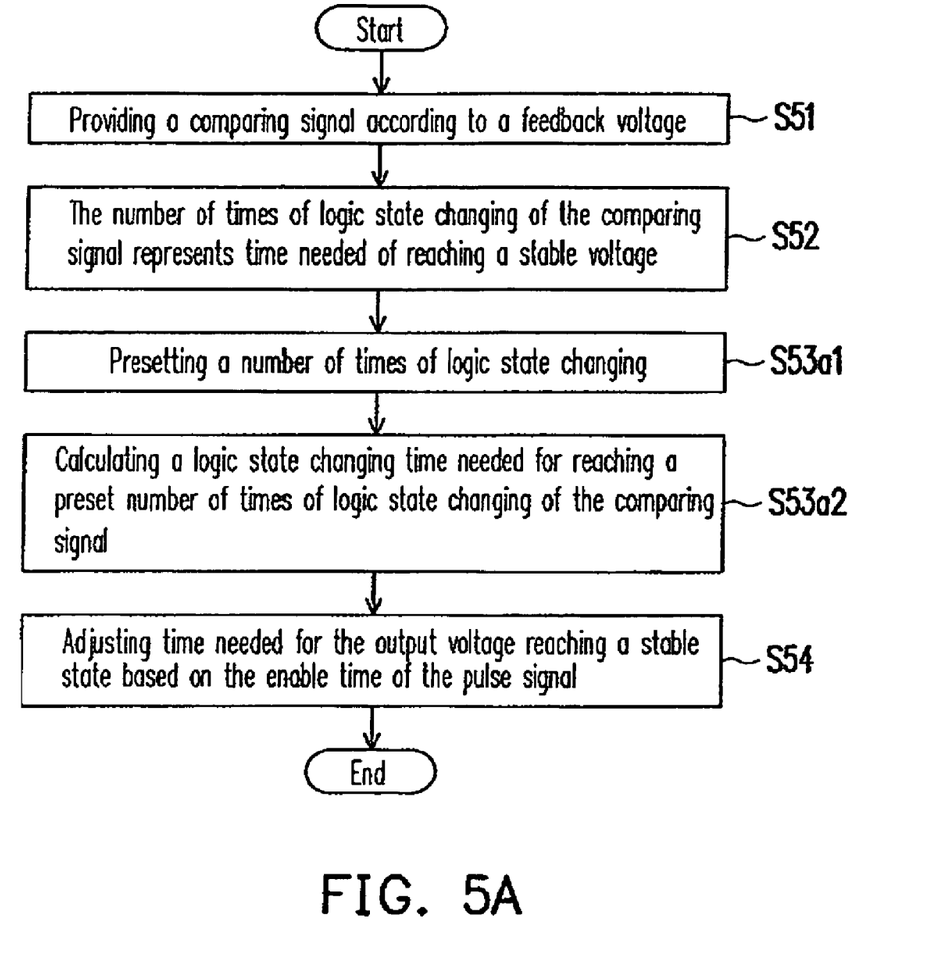

According to another aspect, as shown in FIG. 5A, the step S53 of the aforementioned method for stabling a voltage and improving the energy conversion efficiency may be substituted in another embodiment by the following step: first, a number of times of logic state changing is preset, as shown in step S53a1 of FIG. 5A. Next, the time needed for a number of times of logic state changing of the comparing signal reaching the preset number of times is calculated and defined as a logic state changing time, as shown in step S53a2 of FIG. 5A. Finally, an enable time of the pulse signal is adjusted according to the logic state changing time.

The present embodiment may solve the problem of extra power consumption due to a low efficiency of power conversion in related art by applying the aforementioned steps. And a tremendous development cost is saved due to automatic adjusting of the enable time.

It should be noted that though an applicable pulse frequency modulating circuit is described above, those having ordinary knowledge in the art should know that different manufacturer has different design of pulse signal of the pulse frequency modulating circuit. Thus, the present invention is not limited by the applicable pulse frequency modulating circuit described herein. In other words, as long as the pulse frequency modulating circuit has a function of adjusting the pulse signal based on the output voltage, it will be considered to be in accordance with the essence of the present invention.

In summary, since a calculating circuit is used for adjusting the enable time of the pulse signal, the present invention has the following advantages:

1. The timed needed for an output voltage reaching a stable state may be automatically adjusted according to the present invention, such that the energy conversion efficiency may be improved and extra power consumption may be avoided.

2. The enable time of the pulse signal may be automatically adjusted according to the present invention. Thus, it is unnecessary for a manufacturer spending human resources and time on searching of a suitable enable time during production. Therefore, a tremendous development cost is saved accordingly.

The following advantages are also shown in the embodiments of the present invention:

1. Since the output voltage is adjusted automatically with the load state, the present invention has a great commercial value on electronic products such as processors, random access memories, displays and cell phones etc. having a power supply providing dynamic load and a high energy conversion.

2. A simple calculator may be applied for implementing the calculating circuit of the present invention. Thus, almost no extra space and cost is required.

It will be apparent to those skilled in the art that various modifications and variations can be made to the structure of the present invention without departing from the scope or essence of the invention. In view of the foregoing, it is intended that the present invention cover modifications and variations of this invention provided they fall within the scope of the following claims and their equivalents.

What is claimed is:

1. A pulse frequency modulating circuit for controlling a power converter comprising:
    an output voltage comparing circuit, for receiving a feedback voltage and comparing the feedback voltage with a reference voltage to output a comparing signal, the feedback voltage being in proportion to an output voltage of the power converter;
    a pulse generating circuit, for receiving the comparing signal and calculating a number of times of logic state changing of the comparing signal within a preset period to determine an enable time of a pulse signal, and outputting the pulse signal when the comparing signal being in a first logic state; and
    a switch circuit, coupled to the pulse generating circuit, the output voltage comparing circuit and the power converter, for transmitting the pulse signal from the pulse generating circuit to the power converter when the comparing signal being in the first logic state;
    wherein the power converter adjusts the output voltage based on the enable time of the received pulse signal.

2. The pulse frequency modulating circuit as claimed in claim 1, wherein the output voltage comparing circuit comprises:
    an amplifier, a positive terminal thereof is received the reference voltage, a negative terminal thereof is received the feedback voltage, and output terminal thereof is outputted the comparing signal.

3. The pulse frequency modulating circuit as claimed in claim 1, wherein the switch circuit comprises:
    an AND gate, a first input terminal thereof is received the comparing signal, a second input terminal thereof is received the pulse signal, for performing an AND calculation on signals of the first input terminal and the second input terminal, then outputting a calculated result to the power converter.

4. The pulse frequency modulating circuit as claimed in claim 3 further comprising a buffer circuit, coupled between an output terminal of the AND gate and the power converter, for increasing driving ability of a signal from the output terminal of the AND gate.

5. The pulse frequency modulating circuit as claimed in claim 1, wherein the pulse generating circuit comprises:
    a calculating circuit, for calculating a number of times of logic state changing of the comparing signal within the preset period, and generating a pulse width ratio according to the calculated number of times; and
    a pulse generator, coupled to the calculating circuit for receiving the pulse width ratio, for generating the pulse signal and adjusting an enable time of the pulse signal according to the pulse width ratio.

6. A power supply for outputting an output voltage, comprising:
    a pulse frequency modulating circuit, for providing a comparing signal being in a first logic state when the output voltage being lower than a preset voltage, and providing a pulse signal when the comparing signal being in the first logic state, for calculating a number of times of logic state changing of the comparing signal within a preset period, and adjusting an enable time of the pulse signal based on the number of times of logic state changing; and
    a power converter, coupled to the pulse frequency modulating circuit, for adjusting the output voltage based on the enable time of the pulse signal.

7. The power supply as claimed in claim 6, wherein the power converting circuit is a boost circuit.

8. The power supply as claimed in claim 7, wherein the boost circuit comprises:
    an inductor, a first terminal thereof is coupled to an input voltage;
    a switching transistor, a gate terminal thereof coupled to a second terminal of the switch circuit, a first source/drain thereof coupled to a second terminal of the inductor, and a second source/drain thereof coupled to a common voltage;
    a unidirectional conductive element, a first terminal coupled to the second terminal of the inductor, for outputting the output voltage from the second terminal thereof;
    a capacitor, a first terminal thereof coupled to the second terminal of the unidirectional conductive element, a second terminal thereof coupled to the common voltage; and
    a feedback circuit, coupled to the second terminal of the unidirectional conductive element, for generating the feedback voltage based on the output voltage.

9. The power supply as claimed in claim 6, wherein the pulse frequency modulating circuit comprises:
    an output voltage comparing circuit, for receiving and comparing a feedback voltage being in proportion to the output voltage with a reference voltage, and outputting the comparing signal based on a comparing result;
    a pulse generating circuit, for receiving the comparing signal and calculating the number of times of logic state changing within the preset period to determine the enable time of the pulse signal, and outputting the pulse signal when the comparing signal being in the first logic state; and a switch circuit, coupled to the pulse generating circuit, the output voltage comparing circuit and the power converter, for transmitting the pulse signal from the pulse generating circuit to the power converter when the comparing signal being in the first logic state.

10. The power supply as claimed in claim 9, wherein the power converter adjusts the output voltage based on the enable time of the output pulse signal of the switch circuit.

11. The power supply as claimed in claim 9, wherein the output voltage comparing circuit comprises:
an amplifier, a positive terminal thereof is received the reference voltage, a negative terminal thereof is received the feedback voltage, a output terminal thereof is outputted the comparing signal.

12. The power supply as claimed in claim 9, wherein the switch circuit comprises:
an AND gate, a first input terminal is received the comparing signal, a second input terminal thereof is received the pulse signal, for performing an AND calculation on signals of the first input terminal and the second input terminal.

13. The power supply as claimed in claim 12 further comprising a buffer circuit, coupled between an output terminal of the AND gate and the power converter, for increasing driving ability of a signal from the output terminal of the AND gate.

14. The power supply as claimed in claim 9, wherein the pulse generating circuit comprises:
a calculating circuit, for calculating a number of times of logic state changing of the comparing signal within the preset period, and generating a pulse width ratio according to the calculated number of times; and
a pulse generator, coupled to the calculating circuit, received the pulse width ratio, for generating the pulse signal and adjusting an enable time of the pulse signal according to the pulse width ratio.

15. A method for stabilizing voltage output from a power converter, the method comprising:
providing a comparing signal according to a feedback voltage;
setting the comparing signal in a first logic state when an output voltage being lower than a preset voltage;
providing a pulse signal when the comparing signal being in the first logic state;
calculating a number of times of logic state changing of the comparing signal within a preset period;
adjusting an enable time of the pulse signal based on the number of times of logic state changing; and
adjusting the output voltage based on the enable time of the pulse signal;
wherein the enable time is the pulse width ratio of the pulse signal.

16. A pulse frequency modulating circuit for controlling a power converter, comprising:
an output voltage comparing circuit, for receiving a feedback voltage and comparing the feedback voltage with a reference voltage to output a comparing signal, the feedback voltage being in proportion to an output voltage of the power converter;
a pulse generating circuit, for receiving the comparing signal and calculating a time needed for reaching a preset number of times of logic state changing of the comparing signal to determine an enable time of a pulse signal, and outputting the pulse signal when the comparing signal being in a first logic state; and
a switch circuit, coupled to the pulse generating circuit, the output voltage comparing circuit and the power converter, for transmitting the pulse signal from the pulse generating circuit to the power converter when the comparing signal being in the first logic state;
wherein the power converter adjusts the output voltage based on the enable time of the received pulse signal.

17. A method for stabilizing voltage output from a power converter, the method comprising:
providing a comparing signal;
setting the comparing signal in a first logic state when an output voltage being lower than a preset voltage;
providing a pulse signal when the comparing signal being in the first logic state;
calculating a logic state changing time needed for reaching a preset number of times of logic state changing of the comparing signal;
adjusting an enable time of the pulse signal based on the logic state changing time; and
adjusting the output voltage based on the enable time of the pulse signal;
wherein the enable time is the pulse width ratio of the pulse signal.

* * * * *